United States Patent [19]

Restorick et al.

[11] Patent Number: 5,395,581
[45] Date of Patent: Mar. 7, 1995

[54] PROCESS FOR DRAWING A WEB

[75] Inventors: Stephen J. Restorick, North Yorkshire; John P. Donnellan, Merseyside Wall, both of England

[73] Assignee: Imperial Chemical Industries Plc., London, England

[21] Appl. No.: 80,593

[22] Filed: Jun. 24, 1993

Related U.S. Application Data

[63] Continuation of Ser. No. 792,187, Nov. 14, 1991, abandoned.

[30] Foreign Application Priority Data

Nov. 14, 1990 [GB] United Kingdom ............. 9024732

[51] Int. Cl.6 ............................................ B29C 55/14
[52] U.S. Cl. ............................. 264/289.6; 264/290.2; 425/334; 425/391; 26/52; 26/73
[58] Field of Search ............. 264/289.6, 290.2, 235.8; 26/18.5, 20, 52, 72, 73; 425/334, 391, DIG. 48

[56] References Cited

U.S. PATENT DOCUMENTS

| | | | |
|---|---|---|---|
| 2,597,529 | 5/1952 | Redman | 26/18.5 |
| 2,720,018 | 10/1955 | Blount, Jr. | 26/18.5 |
| 3,004,284 | 10/1961 | Limbach . | |
| 3,177,277 | 4/1965 | Adams et al. | 264/289.6 |
| 3,816,584 | 6/1974 | Schmidt | 264/290.2 |
| 4,008,203 | 2/1977 | Jones . | |
| 4,241,478 | 12/1980 | Nürk | 26/18.5 |
| 4,330,499 | 5/1982 | von und zu Aufsess | 264/289.6 |
| 4,629,525 | 12/1986 | Rasmussen | 264/289.6 |

FOREIGN PATENT DOCUMENTS

| | | |
|---|---|---|
| 729077 | 3/1966 | Canada ............. 264/290.2 |
| 1879 | 5/1979 | European Pat. Off. . |
| 184458 | 6/1986 | European Pat. Off. . |
| 1301224 | 7/1962 | France . |
| 1332491 | 6/1963 | France . |
| 1629484 | 2/1971 | Germany . |
| 63-1174 | 1/1988 | Japan . |
| 838708 | 6/1960 | United Kingdom . |
| 2038705 | 7/1980 | United Kingdom . |

*Primary Examiner*—Jill L. Heitbrink
*Attorney, Agent, or Firm*—Cushman, Darby & Cushman

[57] ABSTRACT

A process and apparatus for producing a web achieves relaxation of the web in the machine direction during and/or after heat-treating, by changing the shape of the side edge of the web in the longitudinal plane from a substantially non-linear zone to a substantially linear zone.

8 Claims, 3 Drawing Sheets

PROCESS FOR DRAWING A WEB

This is a continuation of Application Ser. No. 07/792,187, filed on Nov. 14, 1991, which was abandoned upon the filing hereof.

This invention relates to a process and apparatus, particularly a stenter apparatus, for producing a web, particularly a polymeric film.

Processes for the continuous production of webs such as molecularly oriented, particularly biaxially oriented, and heat-set thermoplastics films employ stenter apparatus comprising means for gripping the edges of the web during its transportation through the apparatus. In the production of molecularly oriented and heat-set films, the edge grips often comprise a plurality of clamps or clips which are transported around an endless chain or rail located at each edge of the film. Such clips engage the film edges so strongly that the film is retained in the clips even when subjected to tension during orientation and/or heat setting.

A web, particularly a biaxially oriented thermoplastics film, can be subjected to a relaxation treatment, for example by allowing the web to shrink, in order to improve the dimensional stability and reduce the shrinkability of the web. Relaxation in the transverse direction (TD) can be achieved by the stenter rails moving closer together i.e., "toe in", at the end of the stenter whilst the temperature is raised to heat set the film. There is a need however, for example to produce more isotropic film, to be able to effect relaxation in the machine direction (MD) as well as in the TD direction, in the stenter apparatus.

Japanese Patent Application No-63-1174 discloses a method of achieving MD relaxation in the production of biaxially oriented film by reducing the distance between adjacent clips in the stenter. A method of moving the clips along the thread on a spiral screw of variable thread pitch is specifically disclosed.

Japanese Patent Application No-62-211124 discloses a similar method of achieving MD relaxation, except that a reduction in the distance between adjacent clips in the stenter is achieved by employing joints in the inter-clip portions of the chain which carries the clips, said joints permitting mutual bending between adjacent clips on the chain.

Prior art methods of achieving MD relaxation have the disadvantage of requiring a complex mechanism for interconnecting clips, and they can also suffer from a lack of flexibility.

We have now devised a process and apparatus for producing a web which overcomes or substantially reduces at least one of the aforementioned problems.

Accordingly, the present invention provides a process for producing a web comprising drawing the web in the machine direction and heat-treating the drawn web, such that the side edge of the web in the longitudinal plane changes, during and/or after heat-treating, from a zone where the edge of the web is substantially non-linear to a zone where the edge of the web is substantially linear, the web shrinking by at least 0.1% in the machine direction during and/or after heat-treating.

The present invention also provides a stenter apparatus comprising a chain which forms an endless loop, said chain comprising clips for engaging with a web material as the web travels through the stenter, said clips being arranged in at least two zones, the first zone comprising clips having a first position which defines a substantially non-linear path in the longitudinal plane for the side edge of the web as the web travels through the zone, the second zone comprising clips having a second position which defines a substantially linear path in the longitudinal plane for the side edge of the web as the web travels through the zone, said clips being movable from first to second positions whilst the web is travelling through the stenter.

The present invention is particularly suitable for producing a web formed from any synthetic, film-forming polymeric material. Suitable thermoplastic materials including a homopolymer of copolymer of a 1-olefine, such as ethylene, propylene and but-1-ene, a polyamide, a polycarbonate, and, particularly, a synthetis linear polyester which may be obtained by condensing one or more dicarboxylic acids or their lower alkyl (up to 6 carbon atoms) diesters, e.g. terephthalic acid, isophthalic acid, phthalic acid, 2,5- 2,6- or 2,7-naphthalenedicarboxylic acid, succinic acid, sebacic acid, adipic acid, azalaic acid, 4,4'-diphenyldicarboxylic acid, hexahydroterephthalic acid or, 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene terephthalate film in particularly preferred, especially such a film which has been biaxially oriented by sequential stretching in two mutally perpendicular directions,, typically at a temperature in the range 70° to 125°, and heat set, typically at a temperature in the range 150° to 250°, for example as described in British patent 838708.

The web may also comprise a polymeric film formed from a polyarylether or thio analogue thereof, particularly a polyaryletherketone, polyarylethersulphone, polyaryletheretherketons, polyaryletherethersulphone, or a copolymer or thioanalogue thereof. Examples of these polymers are disclosed in EP-A-1879, EP-A-184458 and US-A-4008203, particularly suitable materials being those sold by ICI PLC under the Registered Trade Mark STABAR. Blends of these polymers may also be employed.

The web produced according to the invention may be oriented in the machine direction only, but is preferably biaxially oriented by drawing in two mutally perpendicular directions, i.e. in the machine direction (MD) and transverse direction (TD), in the longitudinal plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudial orientation. Sequential stretching may be effected in a stenter process by extruding the thermoplastic material as a flat extrudate which is subsequently stretched first in one direction and then in the other mutually perpendicular direction. Generally, it is preferred to stretch firstly on the MD, i.e. the forward direction through the film stretching machine, and then in the TD. A stretched film may be, and preferably is, dimensionally stabilised by heat-setting under dimensional restraint at a temperature above the glass transition temperature thereof. By allowing the film to relax, i.e. by controlled shrinking, during or after the heat-setting process, a film of improved dimensionsl stability can be obtained.

Conventional processes for orientating and heat-treating flat thermoplastics films often include process operations prior to operations which are effected in a stenter apparatus, the latter comprising, for example, TD stretching and heat-setting. For example linear polyester films such as polyethylene terephthalate films are normally oriented in the MD by stretching over sets of slow and fast drawing rollers before TD orientation by stretching in a stenter apparatus followed by heat-setting in the same or another stenter apparatus.

Since both side edges of the web are normally gripped as the web passes through the stenter there can be a tendency for the central portion of the film, which is less strongly restrained, to sag or bow slightly. Thus the web, in the stenter, is not necessarily completely flat or planar, and the shape of the edges and middle portion of the web in the longitudinal plane may vary slightly. This "bowing" phenomenon is not relevant to the present invention except that bowing can be reduced by using the present invention, i.e. bowing can be considered to be a problem solved by the present invention.

In an alternative embodiment of the invention, means may be employed for gripping, holding or supporting the middle portion of the web, in addition to gripping the side edges of the web.

The side edge of the web travelling through prior art stenters is substantially linear in the longitudinal plane, i.e. the side edge of the web effectively forms an approximate linear longitudinal line, from entry to exit of the stenter. By substantially non-linear is meant that the side edge of the web deviates from an approximate linear longitudinal line. The path length of the web per unit length of the stenter is thus greater in the non-linear zone than in the linear zone, which enables the web to shrink in the MD direction as it passes from the non-linear to linear zones. The reduction in path length of the web in going from the non-linear to linear zones is suitably greater than 0.1%, preferably less than 8%, and more preferably in the range 1% to 5%, particularly in the range 2% to 4%. The web preferably shrinks less than 8%, and more preferably in the range 1% to 5%, particularly in the range 2% to 4% in going from the non-linear to linear zones.

The drawn web produced using the process and apparatus of the invention preferably exhibits a residual shrinkage in the MD of less than 1%, more preferably less than 0.5%, and especially less than 0.1% when measured by heating the web at 150° C. for 5 minutes. The process and apparatus of the invention is preferably used to produce a biaxially oriented web, which in addition to the aforementioned MD residual shrinkage values also preferably possesses a residual shrinkage value in the TD of less than 1%, more preferably less than 0.5%, and especially less than 0.1% when measured by heating the web at 150° C. for 5 minutes.

The path of the side edge of the web in the longitudinal plane is suitably defined by the clips which hold the side edge of the web. In the linear zone, as in prior art stenters, the clips are positioned at the same angle and in the same longitudinal plane. These clips are referred to as being "unstaggered".

In contrast, in the non-linear zone, according to the invention, the position of the clips can vary, for example adjacent or near-adjacent clips may be in a different position, e.g. tilted, with the face of the clip at a different angle, and/or in a different longitudinal plane in the stenter. Tilting of a clip can be achieved by moving one corner of the clip out of the longitudinal plane such that the face of the clip forms an angle of up to ±90° to the original longitudinal plane. A combination of tilted clips and clips in different longitudinal planes may be used. The aforementioned clips are referred to as being "staggered". The function of the staggering is to increase the path length of the web per unit length of the stenter compared to the unstaggered region, i.e. the linear zone. The web is fed through the aforementioned staggered clips in the stenter and at some point along the stenter the clips are moved into the same position and/or the same longitudinal plane by suitable means, such as tilting and/or displacing the clips up or down relative to the longitudinal plane, resulting in a reduction in the path length of web per unit length of the stenter, enabling relaxation of the web in the MD direction. The clips may be staggered at the front end of the stenter, or alternatively, the zone of staggered clips may begin at some distance into the stenter, e.g. the stenter may comprise, in order from the front to the rear end, an unstaggered zone/a staggered zone/an unstaggered zone. The staggered zone may begin in any one of the areas A1 to A3 of the stenter shown in FIG. 1 below. Similarly, the staggered zone may end in any one of the areas A1 to A3 of the stenter shown in FIG. 1 below. In a preferred embodiment of the invention the staggered zone begins between areas A1 and A2, and the staggered zone ends and the unstaggered zone begins between areas A2 and A3.

The clips are moved from the staggered to unstaggered positions by any suitable means such as displacement of the clips in the longitudinal plane, e.g. by means of a cam, lever, screw or sliding mechanism, or by tilting the clip face, e.g. by means of a cam or lever. Similarly, the clips can be moved from unstaggered to staggered positions, e.g., at the front end of the stenter, by any of the aforementioned means.

A wide range of clips known in the art may be used in the process and apparatus of the invention, such as rectangular or curved clips.

In an alternative embodiment of the invention, the staggered clips which are responsible for holding the side edge of the web out of the linear longitudinal plane may be released from the web, so that the only clips holding the web are in the same longitudinal plane. In this way, the side edge of the web can be altered from non-linear to linear without adjusting the position of any clips, i.e., simply by opening some of the clips. The clips may be released by any method known in the art, e.g. by using a clip opening ramp. If the distance between clips holding the web, after some of the clips have been opened, is too great such that the web is deformed, auxiliary clips may be used in combination with clips in order to hold the web at positions between the clips. Alternatively a combination of adjusting the position of some of the clips, and opening some of the clips may be used.

By using staggered clips the direction of movement of the web is changed, effectively the direction of the web alters once or twice, dependent upon the type and position of the clip, each time a clip is in a different position compared to the adjacent clip, i.e., tilted at a different angle, and/or in a different longitudinal plane. FIG. 3 below gives examples of suitable staggered clip configurations and the resulting changes of direction of movement of the web. FIG. 5 gives examples of further staggered clip configurations.

In a preferred embodiment of the invention the direction of movement of the web changes greater than 2 times, preferably less than 2000 times, more preferably in the range 20 to 1000, and particularly in the range 120 to 700 times in the non-linear (or staggered clip) zone. In one embodiment of the invention, the internal angle formed by the web in changing direction of movement (shown in FIG. 4) is between 90° and 170°, and preferably between 120° and 150°, and more preferably between 130° and 140°.

The invention is illustrated by reference to the accompanying drawings in which.

Figure 1:
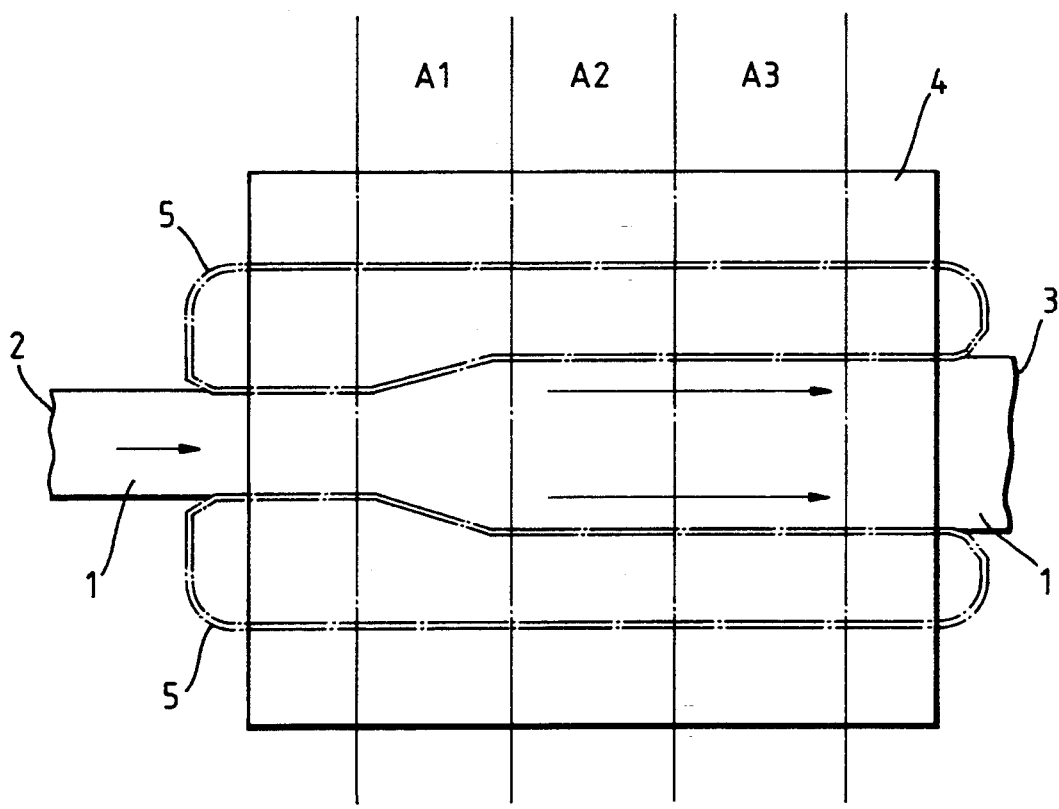
FIG. 1 is a schematic plan view of a stenter apparatus according to one embodiment of the invention.

Referring to FIG. 1, the web (1), having a rear edge (2) and a front edge (3), passes through the stenter (4) in the direction of the arrows. The web is held by clips (not shown) attached to endless chains (5). The stenter is divided up into areas A1, A2 and A3. Drawing of the web in the machine direction occurs in A1. A2 is the heat-set zone, and A3 the cool zone.

Figure 2:
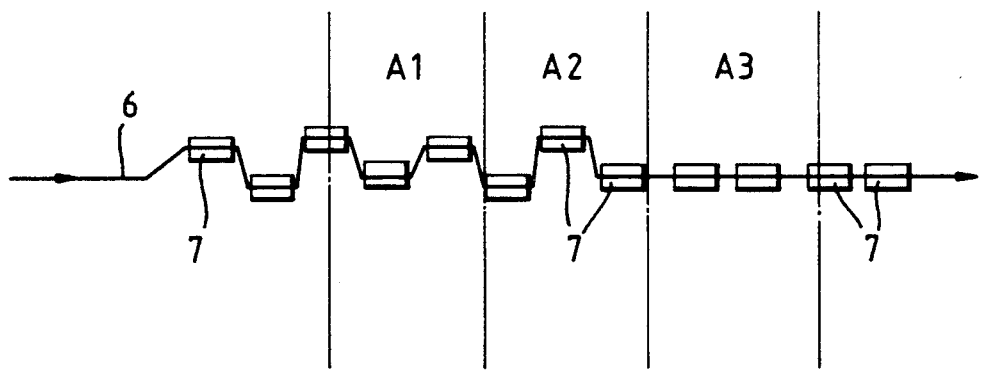
FIG. 2 is a schematic side elevation of the web as it passes through the stenter.

Referring to FIG. 2, the web has a side edge (6) which is substantially linear as it enters the stenter. The web is held by clips (7). In A1 the clips (7) are arranged in two longitudinal planes forming a staggered configuration resulting in the side edge (6) of the web being substantially non-linear. In A3 the clips (7) have moved together into a single longitudinal plane forming an unstaggered configuration with the side edge (6) of the web being substantially linear.

Figure 3A:
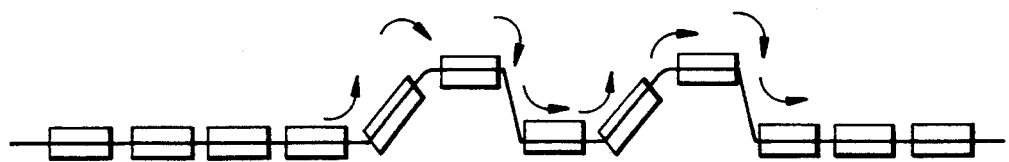
FIG. 3 shows 2 examples of a schematic side elevation of the web in different staggered clip configurations.
Figure 3B:
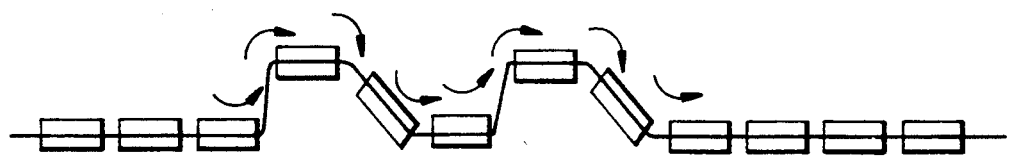

Referring to FIG. 3, the small arrows show where a change of direction of movement the side edge (6) of the web has occurred in the staggered clip zone. In both FIGS. 3A and B the web has changed direction 8 times.

Figure 4:
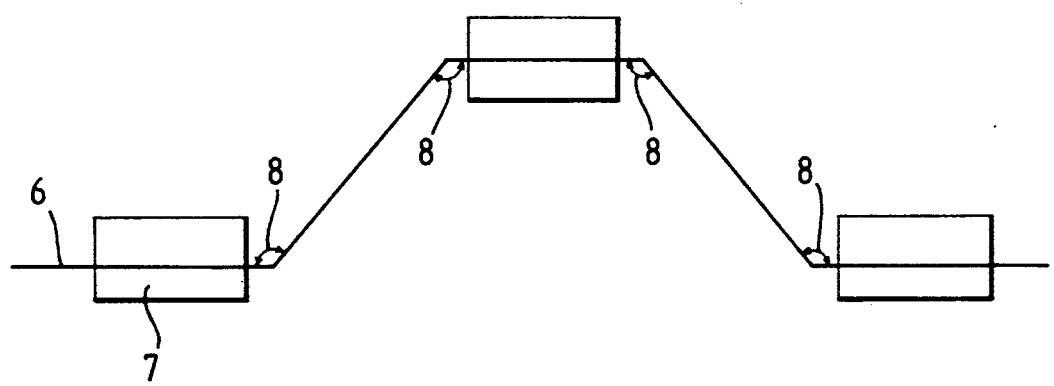
FIG. 4 is a schematic side elevation of another staggered clip arrangement.
Figure 5:
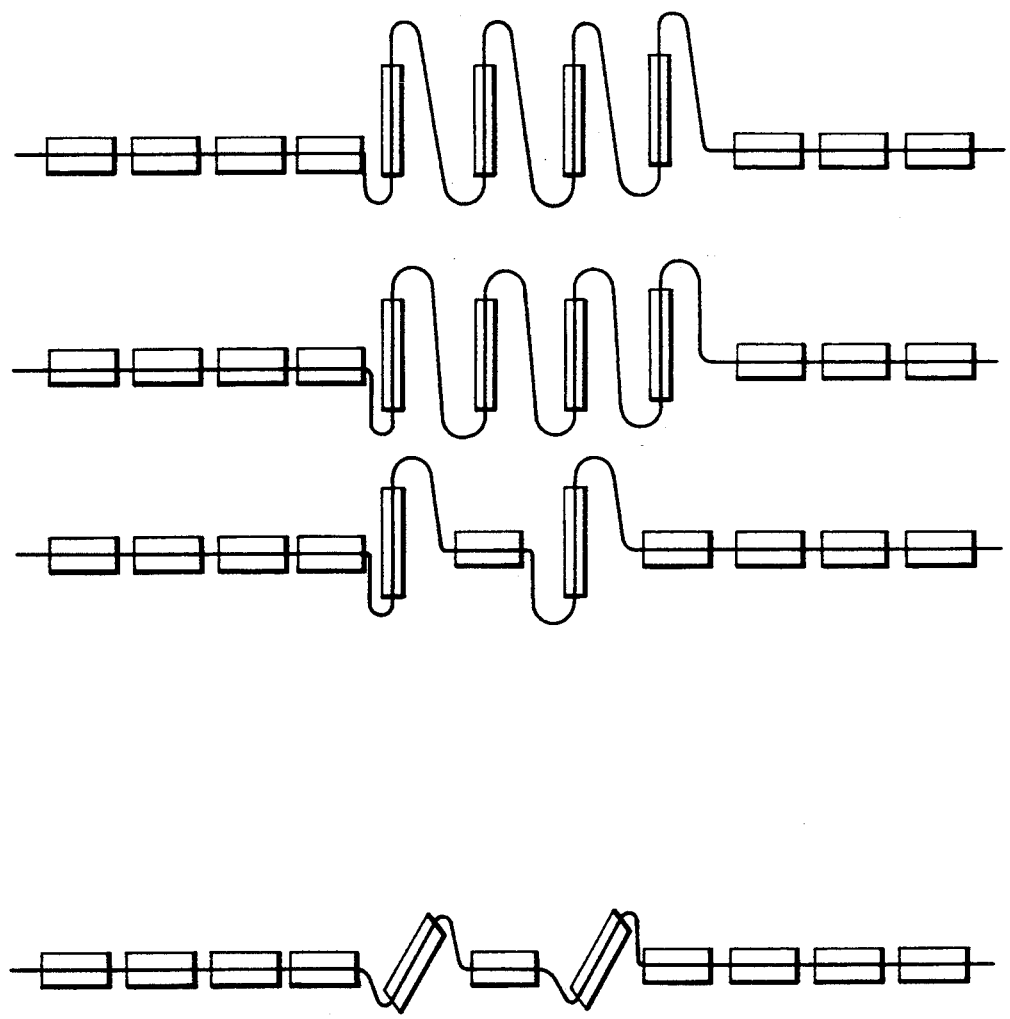
FIG. 5 shows further examples of a schematic side elevation of different staggered clip configurations.

Referring to FIG. 4, the side edge (6) of the web forms an internal angle (8) when changing direction of movement.

The invention is further illustrated by the following examples.

EXAMPLE 1

Molten polyethylene terephthalate was extruded in a conventional manner through a straight film-forming slot die onto a cooling drum, stretched, at a temperature of 90° C., in the MD at a ratio of 3.3. The uniaxially oriented film then entered a stenter apparatus where it was gripped at both edges by clips attached to endless chains. Each alternate clip in a 2 meter length of the chain was displaced vertically by 5 mm relative to the previous adjacent clip, forming a "staggered" clip arrangement of upper and lower clips. In this way the path length of the web through the stenter was increased by 1.2%, compared to the normal "unstaggered" arrangement, i.e., with the clips positioned in the same longitudinal plane. The film was then stretched in the stenter at a temperature of 120° C., in the TD at a ratio of 3.3. The lower clips were then opened using a clip-opening ramp and MD relaxation was achieved by the film shrinking into a linear longitudinal plane. The resultant film was 100 μm thick and 70 cm wide, and was evaluated for residual shrinkage across the film in the MD by heating at 150° C. for 5 minutes and measuring the change in the length of the film. A mean value of 5 measurements was calculated. The results are given in Table 1.

EXAMPLE 2

This is a comparative example not according to the invention. The procedure of Example 1 was repeated except that a normal "unstaggered" clip arrangement was used throughout the length of the stenter. The results are given in Table 1.

TABLE 1

| Example No | MD Shrinkage* |
|---|---|
| 1 | 0.92% |
| 2 (Comparative) | 1.08% |

*These values were measured across the film and no significant difference was observed between the edges and the centre of the film.

The above results illustrate that an improvement in residual MD shrinkage can be obtained using a process and apparatus according to the invention.

We claim:

1. A process for producing a web comprising drawing the web in a machine direction and heat-treating the drawn web in a stenter, such that the side edge of the web in a longitudinal plane changes, during and/or after heat-treating, from a zone where the edge of the web is substantially non-linear to a zone where the edge of the web is substantially linear and the direction of movement of the web, in the non-linear zone, changes greater than two times and the internal angle formed by the web in changing the direction of movement in the non-linear zone is between 90° and 170°, the web shrinking by at least 0.1% in the machine direction during and/or after heat-treating.

2. A process according to claim 1 wherein the direction of movement of the web changes from 20 to 1000 times.

3. A process according to claim 1 wherein a reduction in path length of the web in going from the non-linear to linear zones is in the range from 1% to 5%.

4. A process according to claim 3 wherein the reduction in path length of the web is in the range 2% to 4%.

5. A process according to claim 1 wherein the web is drawn in the transverse direction prior to heat-treating.

6. A process according to claim 1 wherein the web is a polyethylene terephthalate film.

7. A process according to claim 1 for producing a web which comprises drawing the web in a machine direction and heat-treating the drawn web in a stenter, such that the side edge of the web in a longitudinal plane changes, during and/or after heat-treating, from a zone where the edge of the web is substantially non-linear to a zone where the edge of the web is substantially linear and the direction of movement of the web, in the non-linear zone, changes greater than 20 times.

8. A process for producing a web comprising drawing the web in a machine direction and heat-treating the drawn web in a stenter, such that the side edge of the web in a longitudinal plane changes, during and/or after heat-treating, from a zone where the edge of the web is substantially non-linear to a zone where the edge of the web is substantially linear and the direction of movement of the web, in the non-linear zone, changes greater than two times and the angle formed by the web in changing the direction of movement is between 90° and 170°, the web shrinking by at least 0.1% in the machine direction during and/or after heat-treating.

* * * * *